United States Patent
Gawali et al.

(10) Patent No.: US 8,135,981 B1
(45) Date of Patent: Mar. 13, 2012

(54) METHOD, APPARATUS AND SYSTEM TO AUTOMATE DETECTION OF ANOMALIES FOR STORAGE AND REPLICATION WITHIN A HIGH AVAILABILITY DISASTER RECOVERY ENVIRONMENT

(75) Inventors: Ashish L. Gawali, Maharastra (IN); Subash Rajaa, Maharastra (IN)

(73) Assignee: Symantec Corporation, Mountain View, CA (US)

( * ) Notice: Subject to any disclaimer, the term of this patent is extended or adjusted under 35 U.S.C. 154(b) by 254 days.

(21) Appl. No.: 12/165,345

(22) Filed: Jun. 30, 2008

(51) Int. Cl.
*G06F 11/00* (2006.01)

(52) U.S. Cl. .............................. 714/5.1; 714/42; 714/55

(58) Field of Classification Search .................... 714/47
See application file for complete search history.

(56) References Cited

U.S. PATENT DOCUMENTS

| | | | |
|---|---|---|---|
| 5,790,775 A * | 8/1998 | Marks et al. ...................... | 714/9 |
| 6,895,534 B2 * | 5/2005 | Wong et al. ..................... | 714/55 |
| 7,058,858 B2 * | 6/2006 | Wong et al. ..................... | 714/42 |
| 7,124,320 B1 * | 10/2006 | Wipfel ............................ | 714/13 |
| 7,225,356 B2 * | 5/2007 | Monitzer ........................ | 714/12 |
| 7,392,421 B1 * | 6/2008 | Bloomstein et al. ............. | 714/4 |
| 7,634,683 B2 * | 12/2009 | De La Cruz et al. ........... | 714/4.1 |
| 2002/0073354 A1 * | 6/2002 | Schroiff et al. .................. | 714/4 |
| 2002/0178396 A1 * | 11/2002 | Wong et al. ...................... | 714/4 |
| 2003/0051187 A1 * | 3/2003 | Mashayekhi et al. ............. | 714/4 |
| 2003/0079154 A1 * | 4/2003 | Park et al. ........................ | 714/1 |
| 2004/0059805 A1 * | 3/2004 | Dinker et al. ................. | 709/223 |
| 2005/0138517 A1 * | 6/2005 | Monitzer ....................... | 714/746 |
| 2005/0172161 A1 * | 8/2005 | Cruz et al. ........................ | 714/4 |
| 2006/0047776 A1 * | 3/2006 | Chieng et al. ................. | 709/217 |
| 2007/0245167 A1 * | 10/2007 | De La Cruz et al. .............. | 714/4 |

OTHER PUBLICATIONS

"Disaster Recovery With Solaris™ Cluster," White Paper, Apr. 2007, Sun Microsystems, Inc., pp. 1-18.
Benjamin, Lee, "Communications: Data Protection and Disaster Recovery for Exchange Server 2007," TechNet Magazine, Jul. 2007.
Rampratap, Amarnath, "Microsoft® Exchange 2007 Disaster Recovery Model Using NetApp Solutions," Network Appliance, Inc., Jul. 2007, TR-3584.
Read, Tim, "Architecting Availability and Disaster Recovery Solutions," Sun BluePrints™ On-Line, Apr. 2007, Sun Microsystems, Inc.

* cited by examiner

*Primary Examiner* — Scott Baderman
*Assistant Examiner* — Kamini Patel
(74) *Attorney, Agent, or Firm* — Campbell Stephenson LLP

(57) ABSTRACT

A method, apparatus and system for improving failover within a high-availability computer system are provided. The method includes obtaining one or more parameters associated with at least one resource of any of the first cluster, second cluster and high-availability computer system. The method also includes detecting, as a function of the parameters, one or more anomalies of any of the first cluster, second cluster and high-availability computer system, wherein the at least one anomaly is a type that impacts the failover. These anomalies may include anomalies within the first and/or second clusters ("intra-cluster anomalies") and/or anomalies among the first and second clusters ("inter-cluster anomalies"). The method further includes generating an alert in response to detecting one or more of the anomalies.

14 Claims, 5 Drawing Sheets

US 8,135,981 B1

METHOD, APPARATUS AND SYSTEM TO AUTOMATE DETECTION OF ANOMALIES FOR STORAGE AND REPLICATION WITHIN A HIGH AVAILABILITY DISASTER RECOVERY ENVIRONMENT

BACKGROUND

1. Field of the Invention

The following generally relates to disaster recovery for computing systems, services, and/or data, and more particularly, to a method, apparatus and system for improving failover within a high availability disaster recovery environment.

2. Description of the Related Art

Uninterrupted continuity of business functions is vital to attain an edge in the competitive market of today's world. Various business groups, such as data centers, production factories, stock exchanges, financial or banking companies, and other entities, have a need for a certain absolute degree of operational continuity during their operations To meet such objective, which is commonly referred to as "business continuity," the business groups generally rely "high availability" ("HA") computing services to service needs of their employees, customers, general members of the public and/or others (collectively "clients"). These business groups typically employ, use, are provided with or otherwise take advantage of HA-computing systems to provide such HA-computing services, and in turn, provide seemingly uninterrupted availability of data ("data availability") to the clients.

To facilitate providing the HA-computing services (and the seemingly uninterrupted data availability), each of the HA-computing systems employ a number of computing resources (e.g., hardware resources and/or software resources). These computing resources typically include computing resources for operating the HA-computing services ("operating resources") and computing resources redundant to the operating-computing resources ("redundant resources") along with protocols ("disaster-recovery protocols") for recovering from a failure.

The failure may include and/or result from one or more man-made and/or natural disasters, including, for example, human errors; power failures; damaged, corrupt, unavailable and/or failed computing resources; earthquakes; floods, etc., effecting one or more of the HA-computing services operating on the operating resources. Generally, the HA-computing services failover to the redundant resources in accordance with the disaster-recovery protocols in response to an occurrence of the failure.

As with other physical assets, the HA-computing systems periodically undergo alteration to accommodate, for example, additional and/or alteration in the HA-computing services (or the computing resources underlying the HA-computing services). The alteration of the HA-computing systems typically include adding, updating, re-configuring and/or upgrading the computing resources, Such alteration, however, may create anomalies that affect the ability of the HA-computing systems to failover properly, or worse yet, failover at all (i.e., an abortive failover), and thereby fail to meet requirements of the business continuity.

SUMMARY

A method, apparatus and system for improving failover within a high-availability computer system are provided. The method includes obtaining a plurality of parameters associated with at least one resource of any of the first cluster, second cluster and high-availability computer system, detecting, as a function of the plurality of parameters, at least one anomaly of any of the first cluster, second cluster and high-availability computer system, wherein the at least one anomaly is a type that impacts the failover; and generating an alert in response to detecting the at least one anomaly.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

Example High-Availability Computing System

Figure 1:
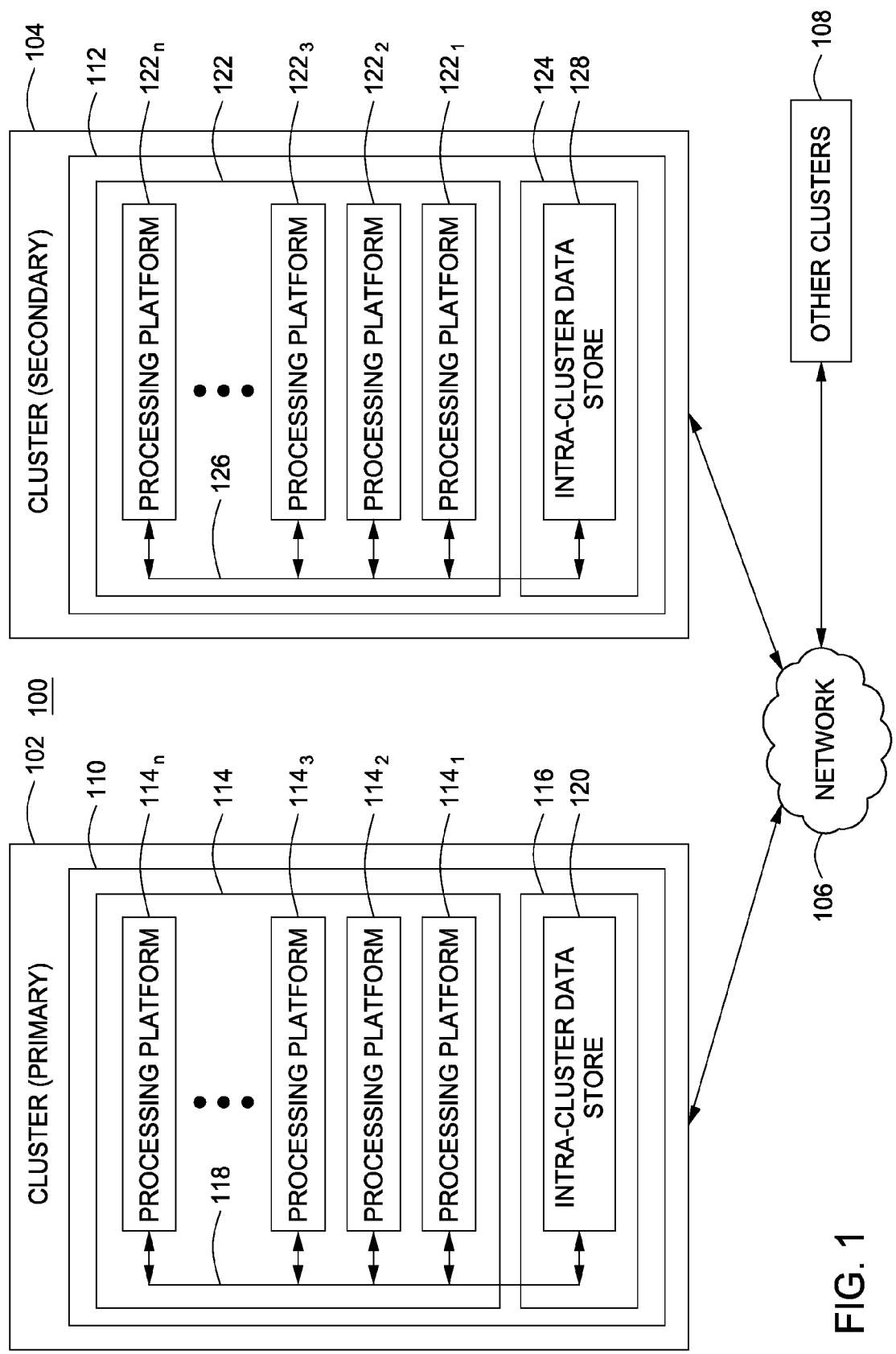
FIG. 1 is a block diagram illustrating an example architecture for a high-availability computing system.

FIG. 1 is a block diagram illustrating example architecture for a high-availability computing system 100. The high-availability ("HA") computing system 100 includes a primary cluster of computers ("primary cluster") 102 disposed at a first installation site and a secondary cluster of computers ("secondary cluster") 104 disposed at a second installation site; although the primary and second clusters 102,104 may be disposed at the same installation site. The primary and secondary clusters 102, 104 may communicatively couple via a network 106.

The HA computing system 100 may optionally include one or more additional primary and/or secondary clusters (shown collectively as "other clusters 108"). These other clusters 108 may include architecture the same as or analogous to the architecture of the primary and/or secondary clusters 102, 104, and/or operate in the same or in a manner analogous to the primary and/or secondary clusters 102, 104. For simplicity of exposition, the architecture and operation of the other clusters is assumed herein to be the same as the primary and/or second clusters 102, 104, unless otherwise stated.

The primary cluster 102 generally handles providing HA-computing services during normal operation, and the secondary cluster 104 generally handles providing one or more of the HA-computing services responsive to a failover from the primary cluster 102. To facilitate this, the primary and secondary clusters 102, 104 may include a number of primary and secondary-cluster resources ("primary-cluster resources and secondary-cluster resources") 110, 112, respectively. Details of example architectures of primary-cluster and secondary cluster resources, which may be representative of respective architectures of the primary-cluster and secondary-cluster resources 110, 112, are described with reference to FIGS. 2A and 2B, respectively.

The primary-cluster resources 110 may include may include a large number of elements, most of which are not shown for simplicity of exposition. As shown, the primary-cluster resources 110 include primary-cluster processing resources 114 and primary-cluster storage resources 116 that are communicatively coupled via a communication link ("intra-cluster link") 118. The intra-cluster link 118 may be formed in accordance with one or more protocols of wired, wireless, satellite, and/or optical communications, including, for example, Ethernet and synchronous optical networking ("SONET") protocols.

The primary-cluster processing resources 114 may include a number of clustered and/or virtualized processing platforms $114_{1-n}$, which may each include attendant data storage (not shown), for carrying out the HA-computing services during normal operation. The primary-cluster storage resources 116 may include a ("primary intra-cluster") data store 120 that is accessible to and provisioned to storing information associated with the HA-computing services carried out by one or more the processing platforms $114_{1-n}$.

Analogous to the primary-cluster resources 110, the secondary-cluster resources 112 may include may include a large number of elements, most of which are not shown for simplicity of exposition. As shown, the second-cluster resources 112 include secondary-cluster processing resources 122 and secondary-cluster storage resources 124 that are communicatively coupled via another communication link ("intra-cluster link") 126. The intra-cluster link 126 may be formed in accordance with one or more protocols of wired, wireless, satellite, and/or optical communications, including, for example, Ethernet and SONET protocols.

The secondary-cluster processing resources 122 may include a number of clustered and/or virtualized processing platforms $122_{1-n}$, which may each include attendant data storage (not shown), for carrying out one or more of the HA-computing services after the failover. The secondary-cluster storage resources 124 may include a ("secondary intra-cluster") data store 128 that is accessible to and provisioned to storing information associated with the HA-computing services carried out by one or more the processing platforms $122_{1-n}$.

The network 106 may provide one or more communication paths among any of, any combination of, any multiple of, any combination of multiples of, etc. (collectively "any") of the primary cluster 102, secondary cluster 104 and other clusters 108. The network 106 may be a partial or full deployment of most any communication or computer network, including any of a public or private, terrestrial wireless or satellite, or wireline network. As such, the network 106 may include network elements from a Public Switch Telephone Network ("PSTN"), the Internet, core and proprietary public networks, wireless voice and packet-data networks, such as 1 G, 2 G, 2.5 G, 3 G and/or 4 G telecommunication networks, wireless office telephone systems ("WOTS") and/or wireless local area networks ("WLANs"), including, Bluetooth and/or IEEE 802.11 WLANs, wireless personal area networks ("WPANs"), wireless metropolitan area networks ("WMANs") and the like.

The network elements may include circuit-switched as well as packet-data elements to provide transport of information any of the primary cluster 102, secondary cluster 104 and other clusters 108. The network elements may be configured to communicate such information using any number of protocols and in any manner consistent with exchanging (e.g., sending and/or receiving) such information among any of the first cluster 102, second cluster 104 and other clusters 108. These protocols may include standardized, proprietary, open-source, and freely-available communication protocols for communicating content in circuit-switching and/or packet data networks, and the like.

During operation, the primary-cluster resources 110 may exchange with the secondary cluster 104 one or more states of the primary-cluster resources 110, including one or more states of any of the primary-cluster processing resources 114 and/or the primary-cluster storage resources 116. The secondary cluster may use these states ("inter-cluster states") to replicate the primary-cluster resources 110 at the secondary-cluster resources 112.

The primary-cluster processing resources 114 may exchange with the primary-cluster storage resources 116 one or more states of primary-cluster resources 110, including, for example, one or more states of the attendant data storage of each of the processing resources $114_{1-n}$. These states ("intra-cluster states") may be used to replicate such resources within the primary cluster 102. Analogously, the second-cluster processing resources 122 may exchange with the secondary-cluster storage resources 124 intra-cluster states of the secondary-cluster resources 112, including, for example, one or more states of the attendant data storage of each of the processing resources $122_{1-n}$.

To facilitate this, the primary cluster 102 may maintain one or more parameters associated with primary-cluster resources 110 ("cluster parameters"). The primary cluster 102 may also obtain and/or maintain one or more parameters associated with any of the second-cluster resources 112, resources associated with the other clusters 108 and/or the HA-computing system 100 ("system parameters").

Analogously, the secondary cluster 102 may maintain cluster parameters associated with the secondary-cluster resources 112. The secondary cluster 102 may also obtain and/or maintain system parameters associated with any of the first-cluster resources 112, resources associated with the other clusters 108 and/or the HA-computing system 100.

As described in more detail below, the primary cluster 102 (or secondary cluster 104) may function to obtain the cluster and/or system parameters, analyzing such parameters to determine dependencies among them, detect one or more anomalies that affect the failover including those (i) within the primary cluster 102 ("intra-cluster anomalies") and/or (ii) among the primary and secondary (or other) clusters 102, 104, respectively ("inter-cluster anomalies"); and generate an alert responsive to the anomalies. By performing the foregoing functions, corrective action may be taken to resolve the anomalies to improve failover upon an occurrence of a failure. Beneficially, the foregoing functions may allow the HA-computing system 100 to satisfy fairly stringent requirements for business continuity.

Example Cluster Resources

Figure 2A:
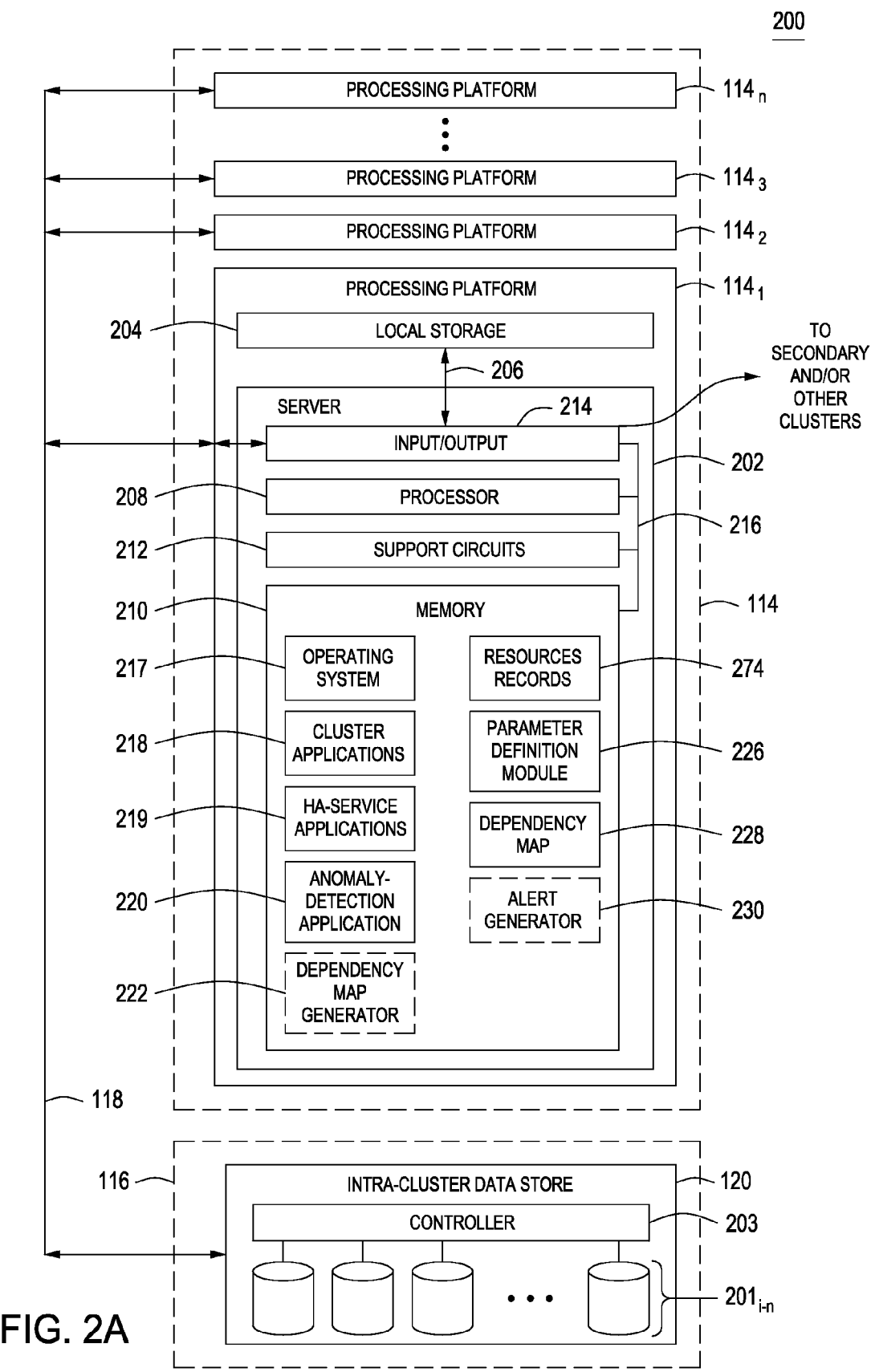
FIGS. 2A and 2B are block diagram illustrating example primary and secondary cluster resources of respective clusters of a high-availability computing system.
Figure 2B:
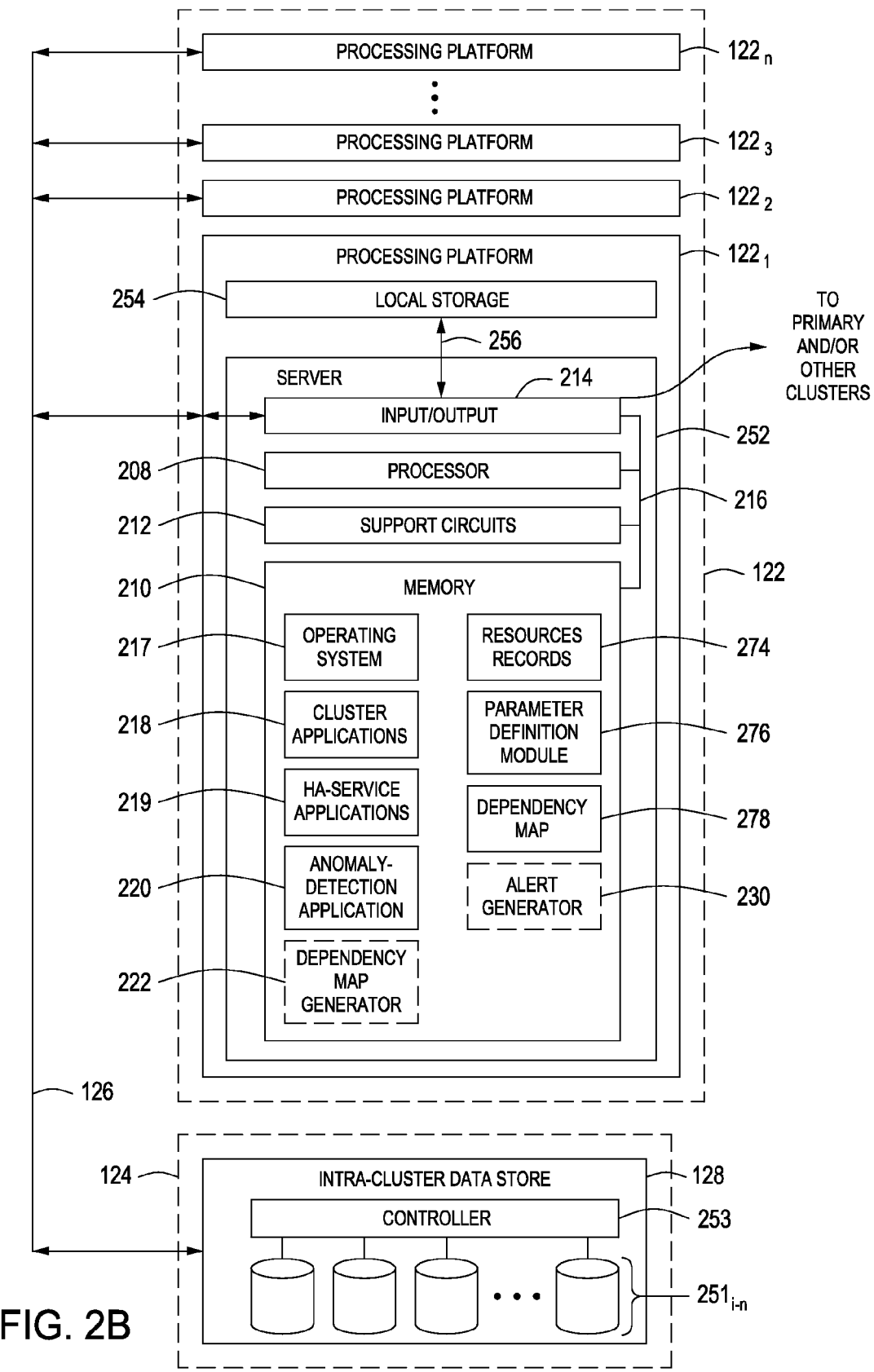

FIGS. 2A and 2B are block diagram illustrating example primary and secondary cluster resources 200, 250 of respective clusters of a high-availability computing system. The primary cluster resources 200 may embody any and/or all of the primary-cluster resources 110 discussed above. The secondary-cluster resources 250 may embody any and/or all of the secondary-cluster resources 112 discussed above. For convenience, the primary and secondary cluster resources 200, 250 are described with reference to the primary and secondary clusters 102, 104, respectively, and the HA-computing system 100 of FIG. 1.

The primary-cluster resources 200 may include the primary-cluster processing resources 114 and the primary-cluster storage resources 116, which are communicatively coupled via the intra-cluster link 118. As above, the primary-cluster processing resources 114 may include the processing platforms $114_{1-n}$ and the primary-cluster storage resources 116 may include the primary intra-cluster data store 120.

The primary-cluster data store 120 may include a number of storage devices $201_{1-n}$ and a controller 203. The storage devices $201_{1-n}$ and a controller 203 may be arranged as, be configured to and/or otherwise operate as any of a redundant array of independent disks ("RAID"), a storage area network ("SAN") array and the like.

Each of the processing platforms $114_{2-n}$ may include architecture the same as or analogous to the architecture of the processing platform $114_1$, and/or operate in the same or in a manner analogous to the processing platform $114_1$. For simplicity of exposition, only the architecture and operation of the processing platform $114_1$ is described below.

The processing platform $114_1$ include a server 202 and attendant data storage 204 that communicatively couple via respective a communication link ("local-communication link") 206. The local-communication link 206 may be formed in accordance with one or more protocols of wired, wireless, satellite, and/or optical communications, including, for example, Ethernet and SONET protocols.

The attendant data storage 204 may be or employ any of random access memory, read-only memory, optical storage, magnetic storage, removable storage, erasable programmable read only memory and variations thereof, content addressable memory and variations thereof, flash memory, disk drive storage, removable storage and the like. The attendant data storage 204 may be positioned remotely from the server 202, and act as a "network" data store via the local-communication link 206. The attendant data storage 204 generally operates as a data store for the server 202, and is generally dedicated to handle storage requirements for only the server 202.

The attendant data storage 204 may also handle storage requirements for servers of the other processing platforms $114_{2-n}$ when the processing platforms $114_{1-n}$ form the virtual processing platform. As described in more detail below, the server 202 may use the attendant data storage 204 to facilitate performing its functions.

The server 202 may be deployed in one or more general or specialty purpose computers, personal computers, mainframes, minicomputers, server-type computers and/or any processor-based platform that operates on any suitable operating system, such as Microsoft® Windows®, UNIX, Linux and/or Symbian; and that is capable of executing software.

The server 202 may include a large number of elements; many of which are not shown in FIG. 2A for simplicity of exposition. The elements of server 202 may be formed in a single unitary device and concentrated on a single server, client, peer or other type node. Alternatively, the elements of the server 202 may be formed from two or more separate devices, and as such, may be distributed among a number of server, client, peer or other type nodes.

The server 202 may be deployed in accordance with the scale-up and/or scale-out approaches. Using the scale-up approach, the server 202 may have its processing power, amount of memory and number of networkable connections increased by utilizing a symmetrical, multi-processor architecture so as to provide additional capacity. A benefit of this scale-up approach is that such approach provides for simplified configuration and management as compared to the scale-out approach.

Using the scale-out approach, the server 202 may have its processing power, amount of memory and number of networkable connections increased by incrementally adding and/or removing capacity as needed, balancing workload across multiple processors, multiple servers, dedicating specific processors and/or servers for performing specific tasks, using physical or logical servers (e.g., a multi-node cluster approach), etc. In addition, the server 202 may be configurable to communicate with servers of the other processing platforms $114_{2-n}$ via the intra-cluster link 118 so as to form, be arranged or otherwise be combined to form a clustering or virtual processing platform environment within the HA-computing system 100.

As shown, the server 202 may include one or more processing units (collectively "processor") 208, memory 210, supports circuits 212, input/output ("I/O") interface 214 and bus 216. The processor 208 may be one or more conventional processors, microprocessors, multi-core processors, microcontrollers and the like.

The bus 216 provides for transmissions of digital information among the processor 208, memory 210, support circuits 212, I/O interface 214 and other portions of the server 202 (not shown). The support circuits 212 facilitate operation of the processor 208, and may include well-known circuitry or circuits, including, for example, one or more I/O interfaces; one or more network interface units ("NIUs"); cache; clock circuits; power supplies and the like.

The I/O interface 214 provides an interface to control the transmissions of digital information between components of processing platform $114_1$ (shown and not shown) and between the processing platform $114_1$ and the other portions of the HA-computing system 100. To facilitate this, the I/O interface 214 may include (i) a NIU for facilitating exchange (e.g., sending and/or receiving) of information, including the intra-cluster states and cluster parameters, with the attendant storage 204 via the local-communication link 206, (ii) a NIU for facilitating exchange of information, including the intra-cluster states and cluster parameters, with the other portions of the cluster resources 200 via the intra-cluster link 118 and/or (iii) a NIU for facilitating exchange of information, including the inter-cluster states, cluster parameters and server parameters, with the secondary and/or other clusters 104, 108 via the network 106. Accordingly, the NIUs may be adapted for communicating in accordance with one or more protocols of wired, wireless, satellite, and/or optical communications, including, for example, Ethernet and SONET protocols In addition, the I/O interface 214 provides an interface to control the transmissions of digital information between I/O devices (not shown) associated with or otherwise attached to the server 202. The I/O devices (not shown) may be embodied as any of (i) storage devices, including but not limited to, a tape drive, a floppy drive, a hard disk drive or a compact disk drive, (ii) a receiver, (ii) a transmitter, (iii) a speaker, (iv) a display, (v) a speech synthesizer, (vi) an output port, and (vii) a pointing device, such as a mouse, joystick, trackball, touchpad, pointing stick, light pen, head pointer, soap mouse, eye tracking devices, digitizing tablet and stylus, data glove that translates the user's movements to computer gestures; and a key-in device, such as a keyboard or a touchpad, (vii) and the like.

The memory 210 may be or employ any of random access memory, read-only memory, optical storage, magnetic storage, removable storage, erasable programmable read only memory and variations thereof, content addressable memory and variations thereof, flash memory, disk drive storage, removable storage and the like. The memory 210 may be generally positioned within and/or resident to the server 202. The memory 210 may also be extended (e.g., by way of the operating system) to include the attendant data storage 204. For simplify of exposition, the memory 210 and the attendant data storage 204 operate in conjunction, and as such, are collectively referred to herein after as memory 210, unless otherwise stated.

The memory 210 may store and may be queries by the processor 208 to obtain various software packages to be executed locally on the server 202. These software packages may include an operating system 217, one or more software applications for clustering the processing platforms $114_{1-n}$ ("cluster applications 218") and one or more software applications for carrying out the HA-computing services ("HA-service applications 219").

The cluster applications 218 may be executed by the processor 208 (and processors of the other processing platforms $114_{2-n}$) to cause clustering of and/or formation of a virtual processing platform from the processing platforms $114_{1-n}$ for executing any, some or all of the HA-service applications 219. In addition, the cluster applications 218 may include an inter-cluster-replication application and an intra-cluster-replication application.

The inter-cluster-replication application may be executed by the processor 208 to obtain one or more of the inter-cluster states, and to exchange with or cause replication of such inter-cluster states on the secondary cluster 104. The intra-cluster-replication application may be executed by the processor 208 to obtain one or more states of the intra-cluster states, and to exchange with or cause replication of such intra-cluster states on the primary intra-cluster data store 120. The cluster applications 218 may include, for example, VERITAS Clustering Software ("VCS") with its global clustering option ("GCO"), VERITAS Volume Replicator ("VVR"), Symmetrix Remote Data Facility ("SRDF"), Hitachi True Copy ("HTC") and the like.

The software applications may also include an anomaly-detection application 220, and, optionally, dependency-map and alert generators 222, 230. The memory 210 may further store operands, operators, dimensional values, configurations, parameters and other data (collectively "information") that may be used by any of the operating system 217, cluster applications 218, HA-service applications 219, anomaly detection application 220, dependency-map generator 222 and alert generator 230 to control the operation of and/or facilitate performing the functions of the server 202, and in turn, the cluster resources 200 and the HA-computing system 100.

The information may include any of the inter-cluster states and the intra-cluster states (not shown). The information may also include one or more records 220 associated with the primary-cluster resources 110 ("resources records"), one or more records associated with parameter definitions ("parameter-definition records") 226 and one or more records associated with a dependency map ("dependency map") 228.

The resources records 224 may include information denoting the computing resources of any of the primary cluster 102, secondary cluster 104, other clusters 108 and/or the HA-computing system 100, in whole or in part. As described in more detail below with respect to FIG. 3, the resources records 224 may include information denoting the computing resources 200 (or 110 or 112) allocated to, consumed by or otherwise associated with one of the HA-service applications 219, including any of an application resource, file system and/or volume resource, a disk group resource, a replication resource, and a virtualization resource.

The parameter-definition records 226 may include definitions for a respective number of parameters associated with resources of the computing resources of any of the primary cluster 102, secondary cluster 104, other clusters 108 and/or the HA-computing system 100, in whole or in part. These definitions may include definitions for system parameters, the primary-cluster parameters, which, in turn, may include definitions for the server 202 ("server parameters").

The server parameters may include one or more parameters associated with the computing resources 200 (or 110) allocated to, consumed by or otherwise associated with one of the HA-service applications 219, including parameters associated with the (i) application resource ("application-resource parameters"), (ii) file system and/or volume resource ("file-system/volume-resource parameter"), (iii) disk group resource ("disk-group-resource parameter") and (iv) replication resource ("replication-resource parameter").

The dependency map 228 may store and be configured to provide to the anomaly detection module 220 one or more dependencies among the computing resources denoted in the resources records 224. The dependency map 228 may include, for example, a dependency computed between the disk group resource and the primary-cluster storage resources 116.

The dependencies stored in the dependency map 228 may be obtained by detecting via one or more interfaces of the clustering applications 218. These interfaces may be, for example, a command line interface and/or an application programming interface. Alternatively and/or additionally, the interfaces of clustering software 218 may be used for detecting dependencies. As another alternative or addition, interfaces of disk-management software, including, for example, interfaces of array level disks, disk groups, volumes, file systems, may be used for detecting the dependencies. The optional dependency-map generator 222, which may be change management software, may be used to detect the dependencies, and generate the dependency map 228 using such dependencies.

The anomaly-detection module 220 may detect one or more anomalies associated with the server parameters, cluster parameters and/or system parameters. The anomaly-detection module 220 may, for example, detect the inter-cluster anomalies (e.g., by performing a comparison) among system parameters associated with the primary cluster 102 and the secondary cluster 104. The anomaly-detection module 220 may also detect the inter-cluster anomalies by, for example, detecting a mismatch in the file system resource of the primary cluster 102 and the replicated file system resource of the secondary cluster 104.

Alternatively and/or additionally, the anomaly-detection module 220 may detect one or more of the intra-server anomalies associated with the server and/or cluster parameters. The anomaly-detection module 220 may, for example, detect the intra-cluster anomalies by detecting a mismatch between the disk group resource and the replication resource.

The alert-generator module 230 operates to generate an alert response to the anomaly-detection module 220 detecting any of the inter-cluster and intra-cluster anomalies.

With reference now to FIG. 2B, the secondary-cluster resources 250 may include architecture the same as or analogous to the architecture of the primary-cluster resources 200, and/or operate in the same or in a manner analogous to the primary-cluster resources 200 except as described herein. The second-cluster resources 252 may include the secondary-cluster processing resources 122 and the secondary-cluster storage resources 124, which are communicatively coupled via the intra-cluster link 126. As above, the secondary-cluster processing resources 122 may include the processing platforms $122_{1-n}$ and the primary-cluster storage resources 124 may include the secondary intra-cluster data store 128.

The secondary-cluster data store 128 may include a number of storage devices $251_{1-n}$ and a controller 253. The storage devices 251$_{1-n}$ and a controller 253 may be arranged as, be configured to and/or otherwise operate as any of a RAID, a SAN array and the like.

Each of the processing platforms 122$_{2-n}$ may include architecture the same as or analogous to the architecture of the processing platform 122$_1$, and/or operate in the same or in a manner analogous to the processing platform 122$_1$. For simplicity of exposition, only the architecture and operation of the processing platform 122$_1$ is described below.

The processing platform 122$_1$ include a server 252 and attendant data storage 254 that communicatively couple via respective a local-communication link 256. The local-communication link 256 may be formed in accordance with one or more protocols of wired, wireless, satellite, and/or optical communications, including, for example, Ethernet and SONET protocols.

The attendant data storage 254 may be or employ any of random access memory, read-only memory, optical storage, magnetic storage, removable storage, erasable programmable read only memory and variations thereof, content addressable memory and variations thereof, flash memory, disk drive storage, removable storage and the like. The attendant data storage 254 may be positioned remotely from the server 252, and act as a "network" data store via the local-communication link 206. The attendant data storage 254 generally operates as a data store for the server 252, and is generally dedicated to handle storage requirements for only the server 252.

The attendant data storage 252 may also handle storage requirements for servers of the other processing platforms 122$_{2-n}$ when the processing platforms 122$_{1-n}$ form the virtual processing platform. The server 252 may use the attendant data storage 254 to facilitate performing its functions.

The server 252 has an architecture substantially the same of the architecture of the server 202 of FIG. 2A. As show, the memory 210 of the server 252 includes resource records 274, parameter-definition records 276 and dependency map 278.

The resources records 274 may include information denoting the computing resources of any of the primary cluster 102, secondary cluster 104, other clusters 108 and/or the HA-computing system 100, in whole or in part. As described in more detail below with respect to FIG. 3, the resources records 274 may include information denoting the secondary-computing resources 252 (or 112) allocated to, consumed by or otherwise associated with one of the HA-service applications 219, including any of an application resource, file system and/or volume resource, a disk group resource, a replication resource, and a virtualization resource.

The parameter-definition records 276 may include definitions for a respective number of parameters associated with resources of the computing resources of any of the primary cluster 102, secondary cluster 104, other clusters 108 and/or the HA-computing system 100, in whole or in part. These definitions may include definitions for system parameters, the primary-cluster parameters, which, in turn, may include definitions for the server parameters of server 252.

The server parameters may include one or more parameters associated with the secondary-computing resources 252 (or 212) allocated to, consumed by or otherwise associated with one of the HA-service applications 219, including any of the application-resource, file-system/volume-resource, disk-group-resource and replication-resource parameters.

The dependency map 278 may store and be configured to provide to the anomaly detection module 220 one or more dependencies among the secondary-computing resources 250 (or 112) denoted in the resources records 224. The dependency map 228 may include, for example, a dependency computed between the disk group resource and the secondary-cluster storage resources 124.

The dependencies stored in the dependency map 278 may be obtained by detecting via one or more interfaces of the clustering applications 218. These interfaces may be, for example, a command line interface and/or an application programming interface. Alternatively and/or additionally, the interfaces of clustering software 218 may be used for detecting dependencies. As another alternative or addition, interfaces of disk-management software, including, for example, interfaces of array level disks, disk groups, volumes, file systems, may be used for detecting the dependencies. The optional dependency-map generator 222, which may be change management software, may be used to detect the dependencies, and generate the dependency map 228 using such dependencies.

Example Primary and Secondary Clusters

Figure 3:
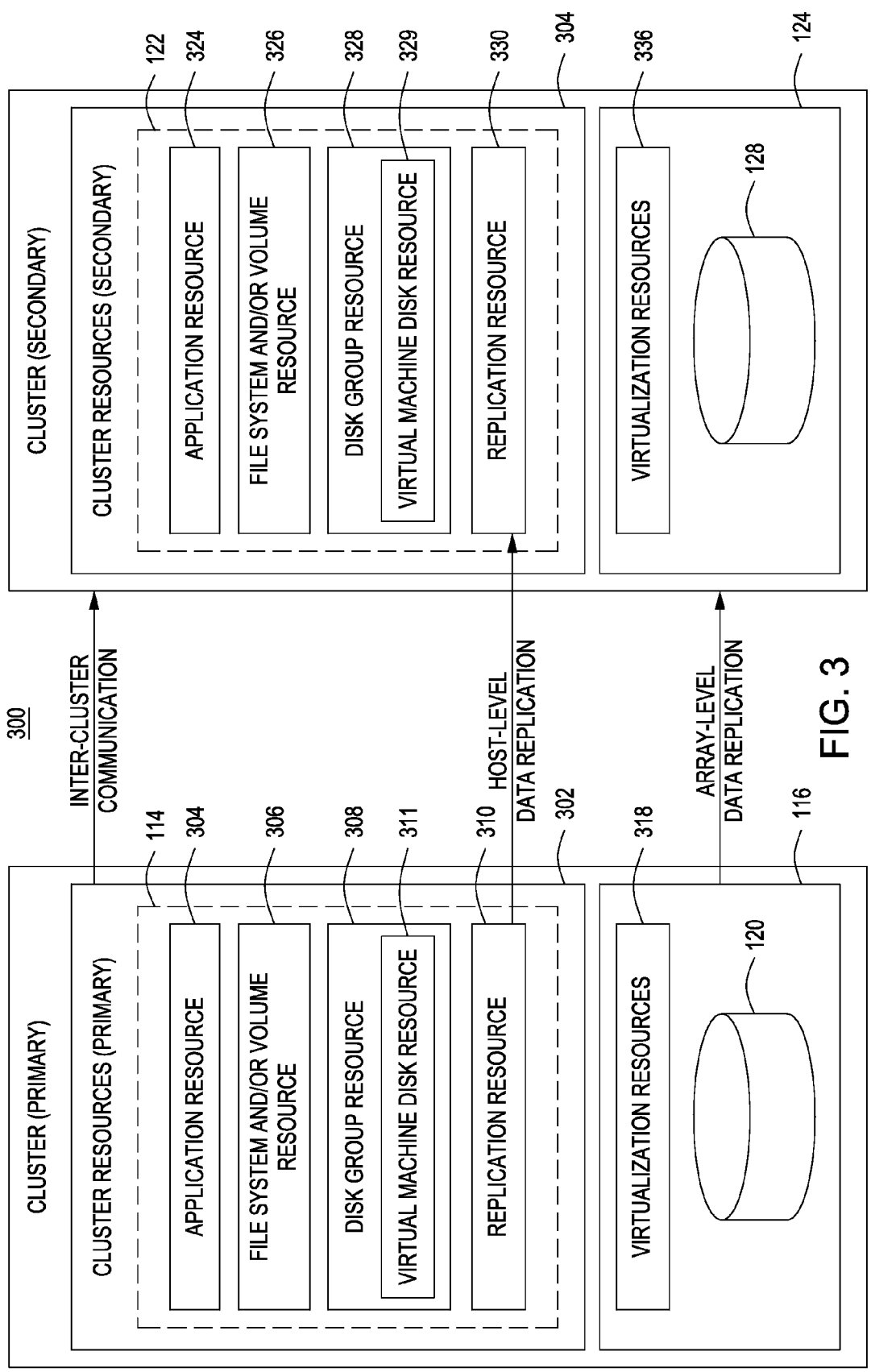
FIG. 3 is a block diagram illustrating example primary-cluster and secondary-cluster resources of respective clusters of a high-availability computing system.

FIG. 3 is a block diagram illustrating example primary-cluster resources and secondary-cluster resources 302, 304 of primary and secondary clusters, respectively, of a high-availability computing system. The primary-cluster and secondary-cluster resources 302, 304 may embody the primary-cluster and/or secondary-cluster resources 200, 250 discussed above. For convenience, the primary-cluster resources and secondary-cluster resources 302, 304 are described with reference to the HA-computing system 100 of FIG. 1 and the primary and secondary cluster resources 200, 250 of FIGS. 2A and 2B.

The primary-cluster resources 302 may include, within the primary-cluster processing resources 114, an application resource 304, a file system and/or volume resource 306, a disk group resource 308, and a replication resource 310. The application resource 304 may be one the HA-services applications 219 ("given HA-service application"), which may be or embody any of financing software, designing software (e.g. Auto CAD), weather forecasting software, production monitoring software. The given HA-service application may also be and/or embody any of a DBMS-based application and/or a database application, such as ORACLE, SAP or DB2.

The application resource 304 may be mounted on the file system and/or volume resource 306, which may be formed in accordance with one or more file system/volume protocols, including for example, File Allocation Table ("FAT"), New Technology File System ("NTFS"), Virtual File System ("VFS"), Journaled File System ("JFS"), Virtual Machine File System ("VMFS") and the like. The application resource 304 may use mounting points (e.g., /mnt, /opt and/or the like) of the volume resource of the file system and/or volume resource 306.

The primary-cluster resources 302 may use the disk group resource 308 for its storage configuration of the memory 210. The disk group resource 308 generally includes volume manager software, such as Logical Volume Manager ("LVM"), VERITAS Volume Manager ("VVM") and the like, which may, for example, provide storage level virtualization. The disk group resource 308 may configure multiple numbers of physical storage disks of the memory 210 into one or more disk groups, and each of the disk groups may have a common configuration. The disk group resource 308 may also include a virtual machine disk resource 311. This virtual machine disk resource 311 may configured for handling a virtual machine environment, such as VMware ESX.

The replication resource 310 may be and/or employ a software module that manages replication of the intra-cluster states within the primary-cluster resources 302. The replication resource 310 may, for example, select one or more of the disk groups of the disk group resource 308 for replication of these disk groups in the primary intra-cluster data store 120. The replication resource 310 may, for example, use the one of the clustering applications 218, such as VERITAS Volume Replicator ("WR"), for managing replication of the intra-cluster states.

The primary-cluster resources 302 may include, within its primary-cluster storage resource 116, a virtualization resource 318 along with the primary intra-cluster data store 120. The primary intra-cluster data store 120 may include one of more logical unit number (LUN) configured in the device and/or one or more LUN group at an array level. The storage virtualization resources 318 may be, for example, an EMC INVISTA or an IBM SAN volume controller to provide an efficient storage management within the primary cluster 102.

The secondary-cluster resources 304 may include architecture the same as or analogous to the architecture of the primary-cluster resources 302, and/or operate in the same or in a manner analogous to the primary-cluster resources 302. For simplicity of exposition, the architecture and operation of the other clusters is assumed herein to be the same as the primary and/or second clusters 102, 104, unless otherwise stated The secondary-cluster resources 304 may include, within its secondary-cluster processing resources 122, replicated versions of the application resource 304, the file system and/or volume resource 306, disk group resource 308, virtual machine disk resource 311 and replication resource 310, namely, replicated-application resource 324, replicated file system and/or volume resource 326, replicated disk group resource 328, replicated virtual machine disk resource 329 and replicated replication resource 330, These replicated version may perform functions similar to their counterpart elements in the primary-cluster resources 302. The secondary-cluster resources 304 may also include, within its secondary-cluster storage resources 124, replicated versions of the primary intra-cluster data store 116 and virtualization resource 318, namely, the secondary intra-cluster data store 128 and virtualization resource 336.

In a high availability computing system 300, in order to recover the application on the same and/or across site, the storage resources of the given HA-services application, such as the file system or volume resource, disk groups resource and/or the like needs to be replicated. Mismatches in the configuration of resources within and/or across the primary cluster and/or secondary-cluster resources 302, 304 may produce the inter-cluster and/or intra-cluster anomalies, respectively, and thereby prevent the failover of the given HA-services application on occurrence of the failure.

For example, a mismatch of the disk group resource parameter, such as logical unit number ("LUN") between the processing platforms 114 and the primary intra-cluster data store 120 may produce one of the intra-cluster anomalies. Alternatively, a mismatch between the disks and/or the virtual machine disks in the disk group resource 308 of the primary-cluster resources 302 and the corresponding LUNs in the primary intra-cluster data store 120 may produce one of the intra-cluster anomalies.

As another alternative, a mismatch between configuration of the one or more LUNs for the given HA-services application in the primary intra-cluster data store 120 and the secondary intra-cluster data store 128 may produce one of the inter-cluster anomalies. A mismatch of array level storage objects across the primary cluster and/or secondary-cluster resources 302, 304 may produce one of the inter-cluster anomalies.

A mismatch of disk group resource, such as LUN between the one or more processing platforms 114, 122 of the primary-cluster resources 302 and the secondary computer cluster site 304 may produce one of the inter-cluster anomalies. A mismatch of between or a different number of file systems and/or file system mounts points across the primary-cluster resources 302 and the secondary-cluster resources 304 may produce the intra-cluster anomaly.

Example Operation

Figure 4:
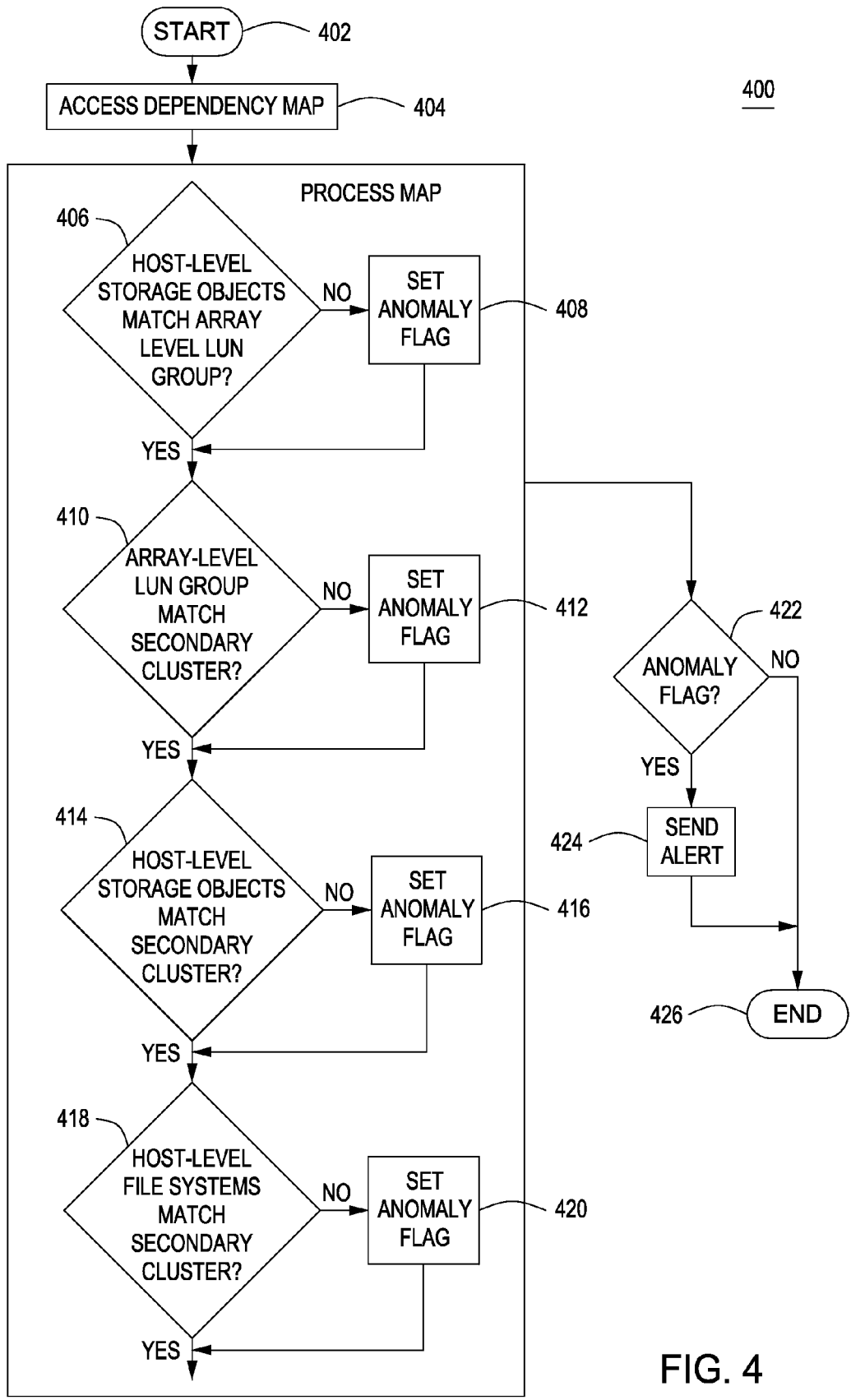
FIG. 4 is a flow diagram of illustrating an example process for detecting an anomaly in a high-availability computing system.

FIG. 4 is a flow diagram of illustrating an example process 400 for detecting an anomaly in a high-availability computing system. For convenience, the process 400 is described with reference to the primary-cluster resources and secondary-cluster resources 302, 304 of FIG. 3, the HA-computing system 100 of FIG. 1 and the cluster resources 200 of FIG. 2.

The process 400 contemplates detecting one or more of the intra-cluster and inter-cluster anomalies for storage and/or file system objects of the given HA-services application of the primary-cluster and secondary-cluster resources 302, 304. The process 400 may be used to detect other intra-cluster and inter-cluster anomalies as well. In addition, the following assumes that the process 400 is carried out (in large part) using the various software packages of the processing platform $114_1$ of the primary-cluster resources 302, including for example, the anomaly-detection application 220. The process 400 may alternatively be carried out using the various software packages of any of (i) the processing platforms $114_{1\text{-}n}$ (individually, combined or in virtual form), and (ii) the processing platforms $118_{1\text{-}n}$ of the secondary-cluster resources 304 (individually, combined or in virtual form).

The process 400 starts at termination block 403 after an occurrence of an event, such as the processing platform $114_1$ executing (e.g., launch, generate, run, maintain, etc.) the anomaly-detection application 220. The event may be other trigger or stimulus as well. After termination block 403, the process 403 may transition to process block 404.

At process block 404, the anomaly-detection application 220 accesses the dependency map 228. The anomaly-detection application 220 may then analyze, inspect and/or interrogate the dependency map 228 to obtain any of the system, cluster and/or server parameters associated with the storage objects, including, for example, any of the storage objects for carrying out process 400. After obtaining these cluster parameters, the process 400 transitions to decision block 406.

At decision block 406, the anomaly-detection application 220 detects whether an intra-cluster anomaly exists among host-level storage objects of the primary-cluster resources 302 and array-level storage objects of the primary intra-cluster data store 116. This may include, for example, the anomaly-detection application 220 detecting whether the intra-cluster anomaly exists among the number of disks in the disk group resource 308 and the LUNs of the primary intra-cluster data store 116.

To facilitate determining whether the intra-cluster anomaly exists, the anomaly-detection application 220 may compare the cluster and/or server parameters associated with the host-level storage objects ("host-level-storage parameters") with the cluster and/or server parameters associated with the array-level storage objects ("array-level-storage parameters") to determine whether one or more of the host-level-storage and array-level-storage parameters differ. If such parameters differ, then the anomaly-detection application 220 detects that the intra-cluster anomaly exists; otherwise, the anomaly-detection application 220 does not detect that the intra-cluster anomaly exists. The anomaly-detection application 220 may detect whether the intra-cluster anomaly exists in other ways as well.

If the anomaly-detection application 220 does not detect that the intra-cluster anomaly exists, then the process 400 may transition to decision block 410. If the anomaly-detection application 220 detects that the intra-cluster anomaly exists, then the process 400 may transition to process block 408.

At process block 408 a first anomaly flag is set. The process 400 may then transition to decision block 422 (as described in more detail below), or transition to decision block 410.

At decision block 410, the anomaly-detection application 220 detects whether a first inter-cluster anomaly exists among array-level LUN group of the primary intra-cluster data store 116 and an array-level LUN group of the secondary inter-cluster data store 132. To facilitate determining whether the first inter-cluster anomaly exists, the anomaly-detection application 220 may compare the system, cluster and/or server parameters associated with the array-level storage objects of the primary intra-cluster data store 116 with the system, cluster and/or server parameters associated with the array-level storage objects of the secondary intra-cluster data store 132 to determine whether one or more of the such parameters differ. If these parameters differ, then the anomaly-detection application 220 detects that the first inter-cluster anomaly exists; otherwise, the anomaly-detection application 220 does not detect that the first inter-cluster anomaly exists. The anomaly-detection application 220 may detect whether the first inter-cluster anomaly exists in other ways as well.

If the anomaly-detection application 220 does not detect that the first inter-cluster anomaly exists, then the process 400 may transition to decision block 414. If the anomaly-detection application 220 detects that the first inter-cluster anomaly exists, then the process 400 may transition to process block 412.

At process block 412 a second anomaly flag is set. The process 400 may then transition to decision block 422 (as described in more detail below), or transition to decision block 414.

At decision block 414, the anomaly-detection application 220 detects whether a second inter-cluster anomaly exists among host-level storage objects of the primary-cluster resources 302 and the host-level storage objects of the secondary-cluster resources 304. This may include the anomaly-detection application 220 detecting whether the second inter-cluster anomaly exists among the disk group resource 308 and the replicated disk group resource 328.

To facilitate determining whether the second inter-cluster anomaly exists, the anomaly-detection application 220 may compare the system, cluster and/or server parameters associated with the host-level storage objects of the primary-cluster resources 302 with the system, cluster and/or server parameters associated with the host-level storage objects of the secondary-cluster resources 304 to determine whether one or more of the such parameters differ. If these parameters differ, then the anomaly-detection application 220 detects that the second inter-cluster anomaly exists; otherwise, the anomaly-detection application 220 does not detect that the second inter-cluster anomaly exists. The anomaly-detection application may detect whether the second inter-cluster anomaly exists in other ways as well.

If the anomaly-detection application 220 does not detect that the second inter-cluster anomaly exists, then the process 400 may transition to decision block 418. If the anomaly-detection application 220 detects that the second inter-cluster anomaly exists, then the process 400 may transition to process block 416.

At process block 416 a third anomaly flag is set. The process 400 may then transition to decision block 422 (as described in more detail below), or transition to decision block 418.

At process block 418, the anomaly-detection application 220 detects whether a third inter-cluster anomaly exists among a host-level file system of the primary-cluster resources 302 and a host-level file system of the secondary-cluster resources 304. This may include the anomaly-detection application 220 detecting whether the third inter-cluster anomaly exists among the file system and/or the volume resource 306 and the replicated file system and/or volume resource 326.

To facilitate determining whether the third inter-cluster anomaly exists, the anomaly-detection application 220 may compare the system, cluster and/or server parameters associated with the host-level file system objects of the primary-cluster resources 302 with the system, cluster and/or server parameters associated with the host-level file system objects of the secondary-cluster resources 304 to determine whether one or more of the such parameters differ. If these parameters differ, then the anomaly-detection application 220 detects that the third inter-cluster anomaly exists; otherwise, the anomaly-detection application 220 does not detect that the third inter-cluster anomaly exists. The anomaly-detection application may detect whether the third inter-cluster anomaly exists in other ways as well.

If the anomaly-detection application 220 does not detect that the third inter-cluster anomaly exists, then the process 400 may transition to decision block 422. If the anomaly-detection application 220 detects that the third inter-cluster anomaly exists, then the process 400 may transition to process block 420.

At process block 420, a fourth anomaly flag is set. The process 400 may then transition to process block 422.

At decision block 422, the anomaly-detection application 220 determines whether any of the first, second and third anomaly flags are set. If determined affirmatively, then the process 400 may transition to termination block 426. If determined negatively, then the process 400 may transition to process block 424.

At process block 424, an alert is generated (e.g., by the alter generator 230 of FIG. 2). The alert may, in turn, cause a report to be generated and reported to one or more users of the HA-computing system 100, including, for example, a system administrator. The report may include notations indicating which of the intra-cluster and inter-cluster anomalies cause the alert to be set. Alternatively and/or additionally, the alert and/or report may be used to guide one or more of the users to take appropriate actions to alter the HA-computing system 100 to resolve the intra-cluster and inter-cluster anomalies causing the alter to be set. After process block 424, the method 400 may transition to termination block 426.

At termination block 426, the process 400 may end. Alternatively, the process 400 may be repeated periodically, in continuous fashion, or upon being triggered as a result of a condition or event.

The various embodiments described herein offer various advantages. The inventive method and apparatus may be embedded within the clustering software's for providing better protection against data loss on occurrence of various kinds of failures. Moreover, the detection of anomalies within a high availability system achieves better data recovery protection and thereby assures the business continuity of an organization.

Conclusion

Those skilled in the art will appreciate that the present invention, according to its various embodiments, Variations of the method, apparatus and system described above are possible without departing from the scope of the invention. In view of the wide variety of embodiments that can be applied, it should be understood that the illustrated embodiments are exemplary only, and should not be taken as limiting the scope of the following claims.

For example, although not specifically stated above, the network 106 may be integral to or integrated with other private and public satellite, terrestrial wireless, and wireline networks to provide a wide-ranging coverage area. Furthermore, it is recognized that differences between private and public networks, and differences between circuit-switched and packet-data networks may only be a matter of semantics due to convergence between telecommunication and computing technologies.

In addition, the network 106 may include a few or, alternatively, many network elements, none of which are shown. Using sophisticated and/or simple routing schemas, the network 106 may provide connectivity between the elements of the HA-computing system 100 using few or many of its network elements. The network 106 may be configured in accordance with any number of communication and/or security protocols.

In accordance with above, these communication protocols may include any of 1 G, 2 G, 2.5 G, 3 G and 4 G telecommunication protocol, which may include any the commonly used protocols, such as Advanced Mobile Phone Service ("AMPS"), Time Division Multiple Access ("TDMA"), Global System for Mobile Communications ("GSM"), and Code Division Multiple Access ("CDMA"), Universal Mobile Telecommunications Service ("UMTS"), Wide-band CDMA ("WCDMA"), ultra wideband CMDA, CDMA2000, Generic Packet Radio Services ("GPRS"), Telecommunications Industry Association's ("TIA") IS-94 specifications, and any combination or variation thereof.

The communication protocols may also include any WLAN, WMAN, and/or PAN protocols, which may include any of the commonly used protocols, such as the Institute of Electrical and Electronic Engineers ("IEEE") 802.11 et seq.; IEEE 802.16 protocol, the IEEE 802.15 protocol, the ZigBee specification, the Bluetooth Specification, the WOTS specification, the HiperLAN specification, the HomeRF specification and/or any other wireless-networking protocol that promulgates rules to use licensed and/or freely-available, unlicensed spectrum, which in the United States includes the Industrial, Scientific, and Medical ("ISM") bands.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the invention, as described above, may be implemented in many different forms of logic, including software, firmware and hardware, in the examples illustrated in the Figures. Actual software code (e.g., computer or logic executed instructions) or specialized hardware used to implement aspects consistent with the present invention is not limiting of the present invention. Thus, the operation and behavior of the aspects may not have been described with reference to any specific logic, including specific software code and/or specific hardware logic. It should be understood that a person of ordinary skill in the art would be able to design software and control hardware to implement the aspects of the present invention based on the description herein.

The foregoing description provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

We claim:

1. A method comprising:
obtaining a plurality of parameters associated with each of a first storage resource of a first cluster and a second storage resource of a second cluster, wherein
the first cluster is operable to provide computing services to one or more client systems,
the computing services comprise an application that is hosted by the first cluster,
the application hosted by the first cluster uses data that is stored by the first cluster,
the second cluster comprises replicated data that is replicated from the data on the first cluster,
the second cluster is operable to provide the computing services to the client system(s) responsive to a failover from the first cluster,
the first storage resource of the first cluster stores the data used by the application, and the second storage resource of the second cluster stores the replicated data that is operable to be used by the application when hosted by the second cluster, the plurality of parameters associated with the first and second storage resources comprise first and second logical unit numbers, respectively;

detecting, as a function of the plurality of parameters, at least one anomaly of the first cluster or the second cluster wherein the detecting is performed after the data is replicated to the second cluster as the replicated data, the at least one anomaly indicates a mismatch between the first storage resource associated with the first logical unit number and the second storage resource associated with the second logical unit numbers; and generating an alert in response to detecting the at least one anomaly.

2. The method of claim 1, further comprising:

analyzing the plurality of parameters to determine at least one dependency among at least one storage resource of any of the first cluster or the second cluster.

3. The method of claim 2, wherein the detecting at least one anomaly comprises:

comparing the plurality of parameters as a function of the at least one dependency to detect the mismatch of the at least one storage resource of any of the first cluster or the second cluster.

4. The method of claim 1, wherein the plurality of parameters associated with the first and second storage resources comprise:

any of file system, disk group resource, or replication resource parameters.

5. The method of claim 1, wherein the plurality of parameters define configuration requirements for at least one storage resource for performing a failover, and wherein the mismatch is determined using the configuration requirements.

6. The method of claim 1, wherein the plurality of parameters are further associated with a third storage resource of the first cluster, the third storage resource comprises the at least one object that refers to a portion of the data, and the at least one object is stored using the first storage resource, further comprising:

detecting, as a function of the plurality of parameters, at least another anomaly of the first storage resource and the third storage resource.

7. The method of claim 6, wherein the at least another anomaly indicates a mismatch between the first storage resource associated with the first logical number and the third storage resource associated with the at least one object.

8. An apparatus comprising:

a parameter definition module comprising a plurality of parameters associated with each of a first storage resource of a first cluster and a second storage resource of the first cluster, wherein the first cluster is operable to provide computing services to one or more client systems, the computing services comprise an application that is hosted by the first cluster, the application hosted by the first cluster uses data that is stored by the first cluster, the second storage resource comprises replicated data that is replicated from data on the first storage resource on the first cluster, the first cluster is operable to use the second storage resource when providing the computing services to the client system(s) responsive to a failover, the first storage resource stores the data used by the application, and the second storage resource stores the replicated data that is operable to be used by the application, the plurality of parameters associated with the first and second storage resources comprise first and second logical unit numbers, respectively;

an anomaly detection module adapted to detect, as a function of the plurality of parameters, at least one anomaly of the first cluster or the second cluster, wherein the anomaly detection module is adapted to detect the at least one anomaly after the data is replicated to the second cluster as the replicated data, and the at least one anomaly indicates a mismatch between the first storage resource associated with the first logical unit number and the second storage resource associated with the second logical unit numbers; and an alert generator adapted to generate an alert in response to the detection of the at least one anomaly.

9. The apparatus of claim 8, further comprising:

a dependency map comprising:

at least one dependency among at least one storage resource of any of the first cluster or the second cluster, wherein the at least one dependency is formed as a function of the plurality of parameters.

10. The apparatus of claim 9 further comprising:

a dependency map generator for mapping the at least one dependency.

11. The apparatus of claim 9, wherein the anomaly detection module is further adapted to detect a mismatch of the at least one storage resource of any of the first cluster or the second cluster by comparing the plurality of parameters as a function of the at least one dependency.

12. A system comprising:

a first cluster having a first storage resource used by an application, wherein the first cluster is operable to provide computing services to one or more client systems, the computing services comprise the application that is hosted by the first cluster, and the application hosted by the first cluster uses data that is stored by the first cluster using the first storage resource;

a second cluster having a second storage resource operable to be used by a replication of the application, wherein the data is replicated from the first cluster to the second cluster as replicated data, the second storage resource is operable to store the replicated data operable to be used by the replicated application, and the second cluster is operable to provide the computing services to the client system(s) responsive to a failover from the first cluster;

a parameter definition module comprising parameters associated with the first and second storage resources comprising:

(i) a first logical unit number (LUN) associated with the first storage resource, and (ii) a second LUN associated with the second storage resource;

an anomaly detection module adapted to detect, as a function of any of the parameters, at least one anomaly, wherein
   the anomaly detection module is adapted to detect the at least one anomaly after the data is replicated to the second cluster as the replicated data, and
   the at least one anomaly indicates a mismatch between the first storage resource associated with the first LUN and the second storage resource associated with the second LUN; and
an alert generator adapted to generate an alert responsive to the detection of at least one anomaly.

13. The system of claim 12, further comprising: a dependency map comprising:
   at least one dependency among the first and second storage resources, wherein the at least one dependency is formed as a function of the parameters.

14. The system of claim 13, further comprising:
a dependency map generator for mapping the at least one dependency.

\* \* \* \* \*